J. A. HICKS.
FLUID PRESSURE BRAKE SYSTEM.
APPLICATION FILED APR. 6, 1906.
1,306,665.
Patented June 10, 1919.
5 SHEETS—SHEET 3.
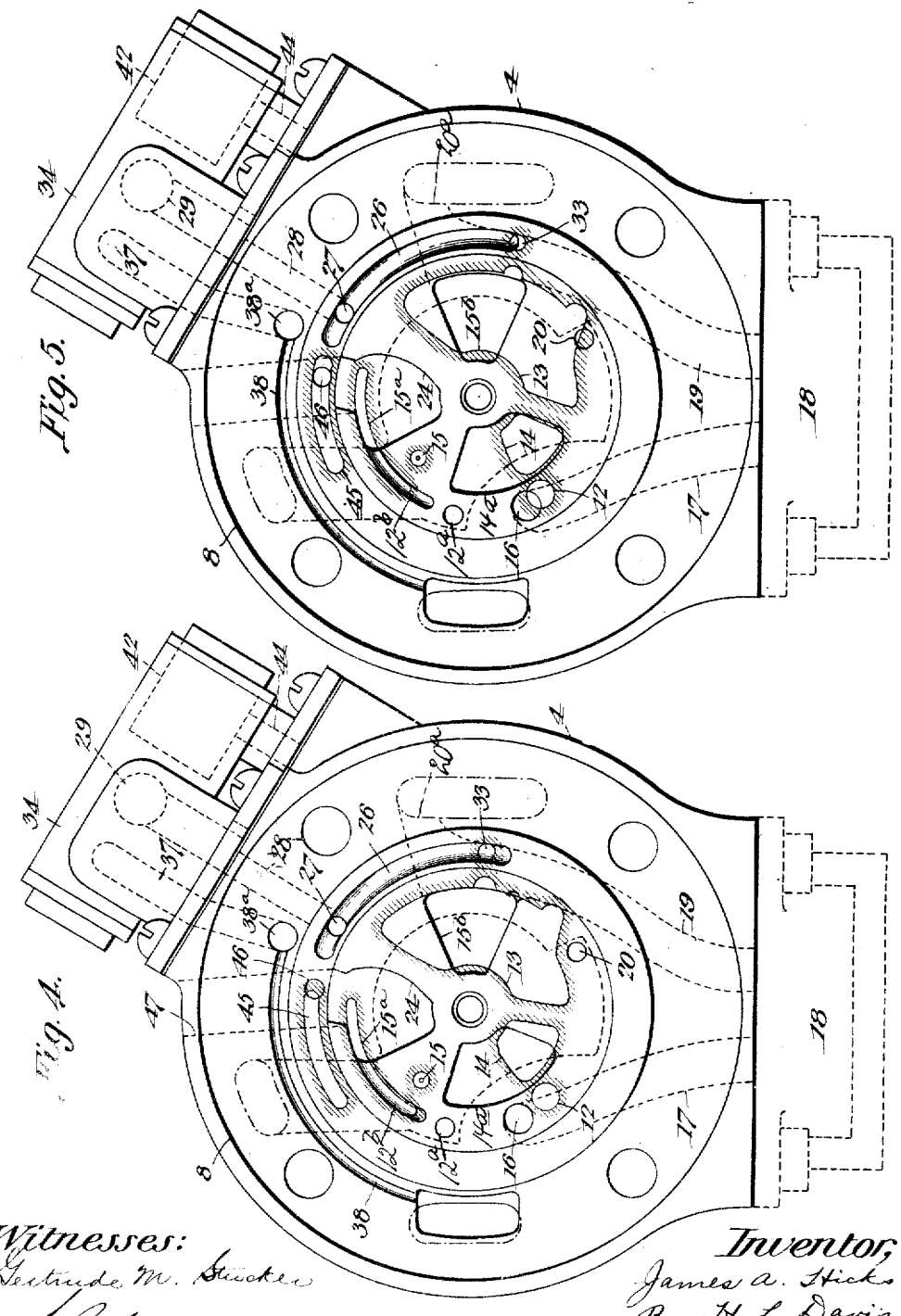

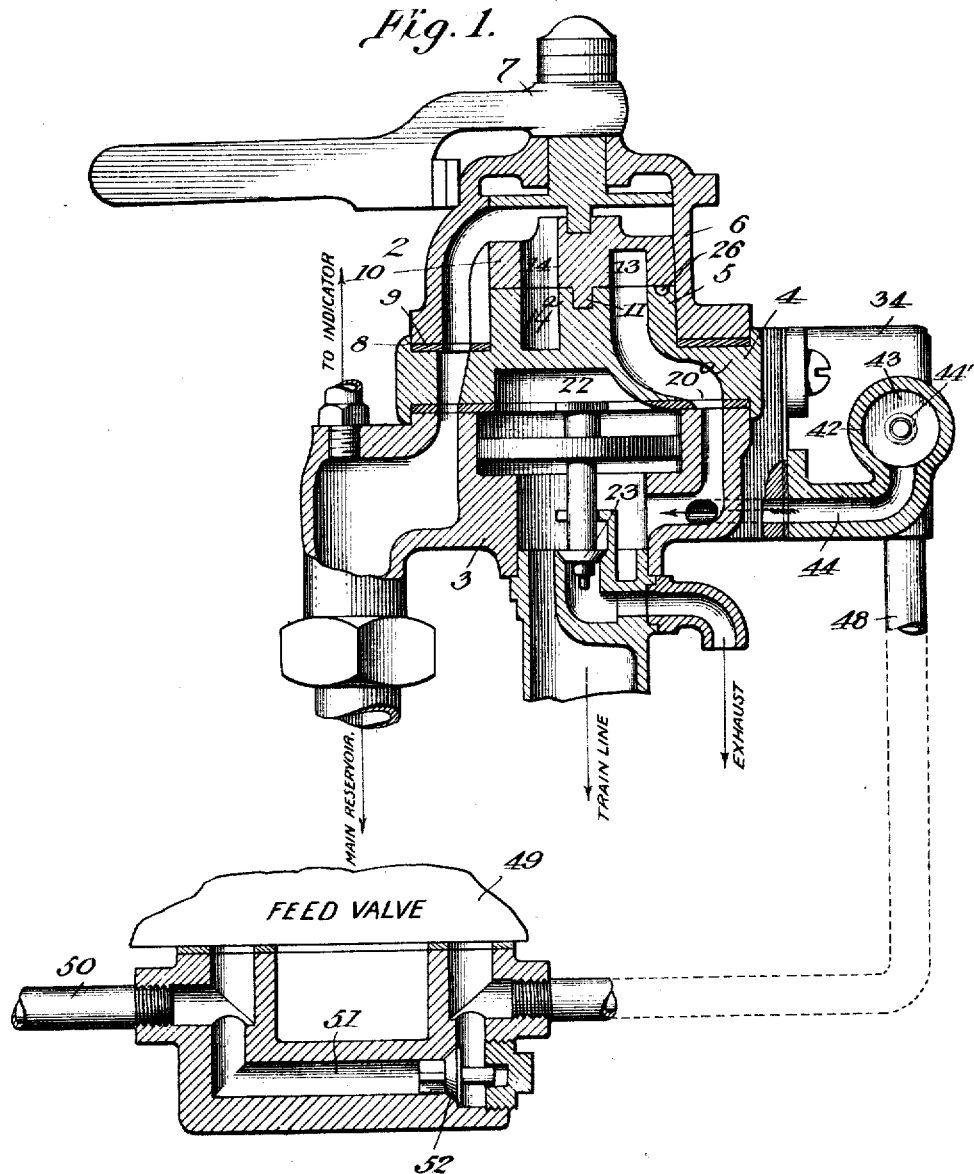

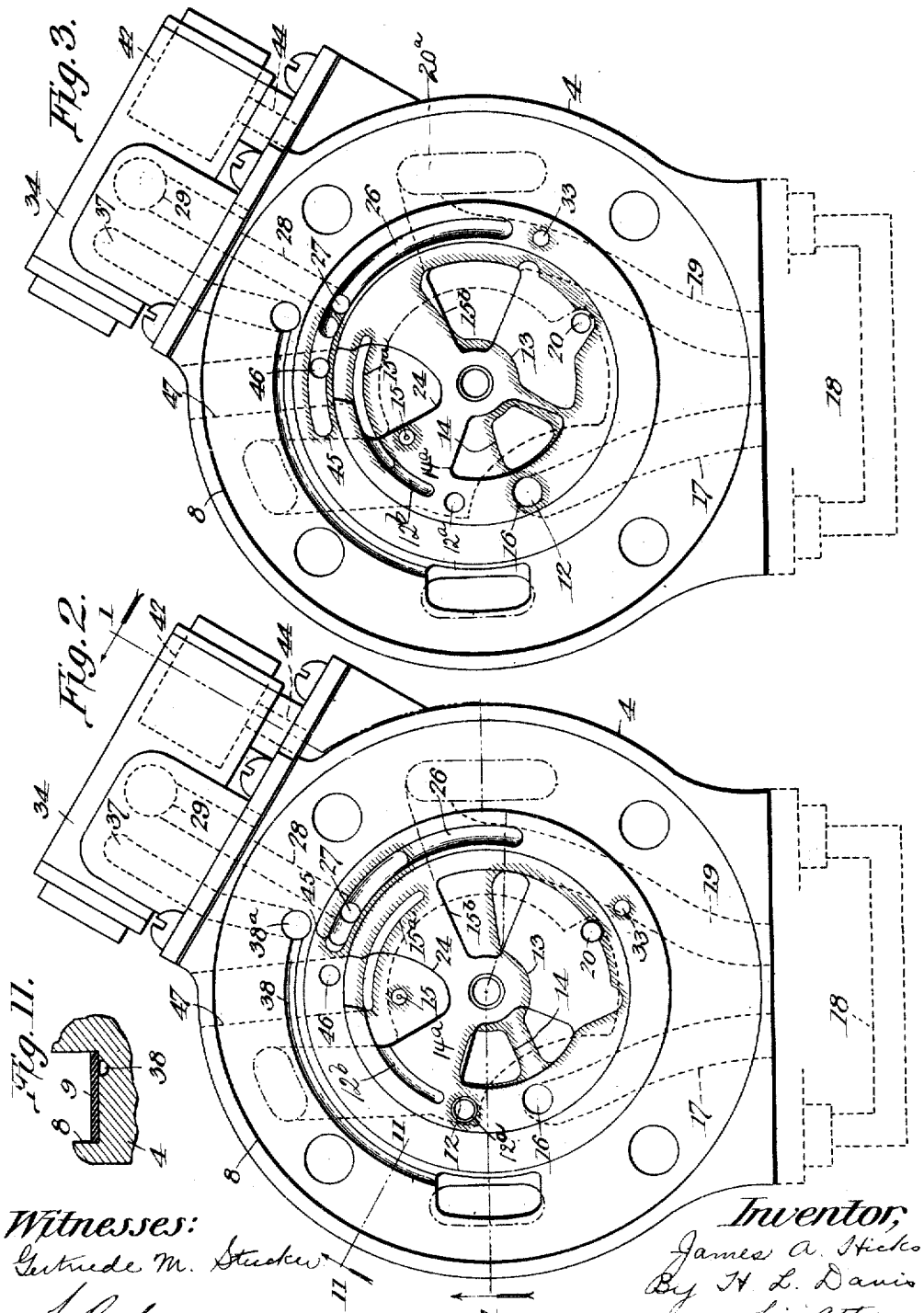
J. A. HICKS.
FLUID PRESSURE BRAKE SYSTEM.
APPLICATION FILED APR. 6, 1906.
1,306,665.
Patented June 10, 1919.
5 SHEETS—SHEET 2.

J. A. HICKS.
FLUID PRESSURE BRAKE SYSTEM.
APPLICATION FILED APR. 6, 1906.
1,306,665.
Patented June 10, 1919.
5 SHEETS—SHEET 4.
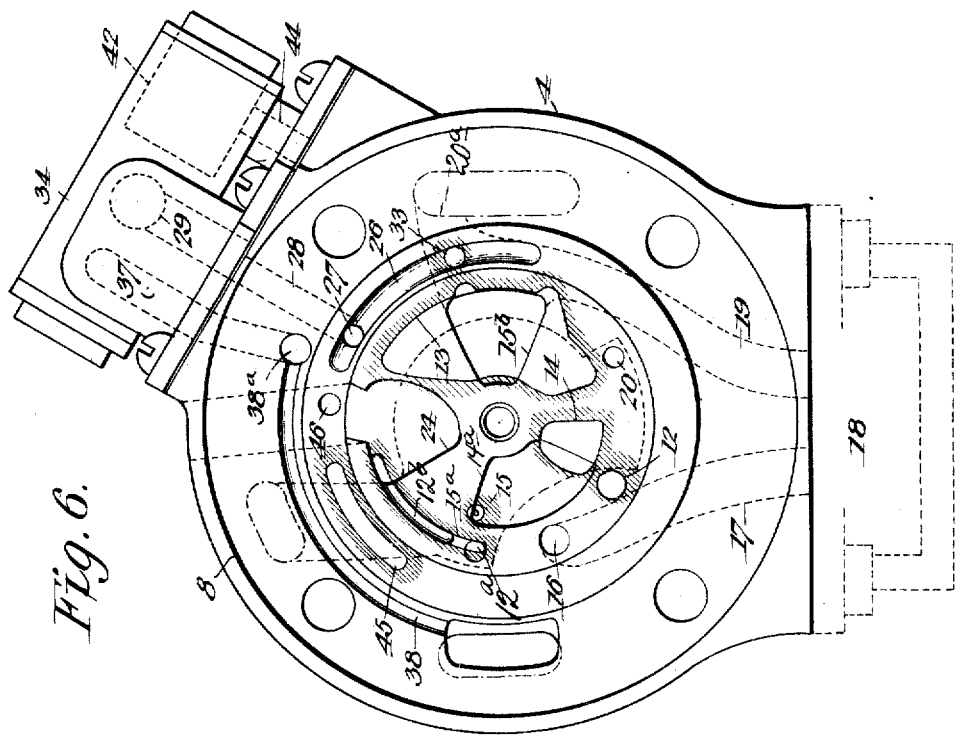
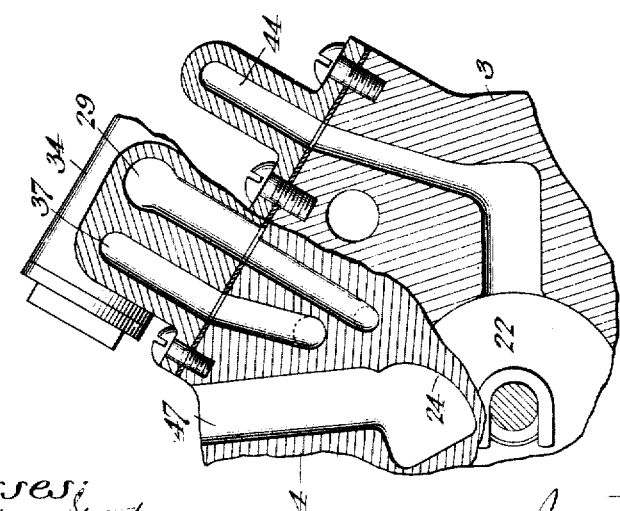
Witnesses:
Inventor,
James A. Hicks
By H. L. Davis
his atty.

J. A. HICKS.
FLUID PRESSURE BRAKE SYSTEM.
APPLICATION FILED APR. 6, 1906.
1,306,665.
Patented June 10, 1919.
5 SHEETS—SHEET 5.
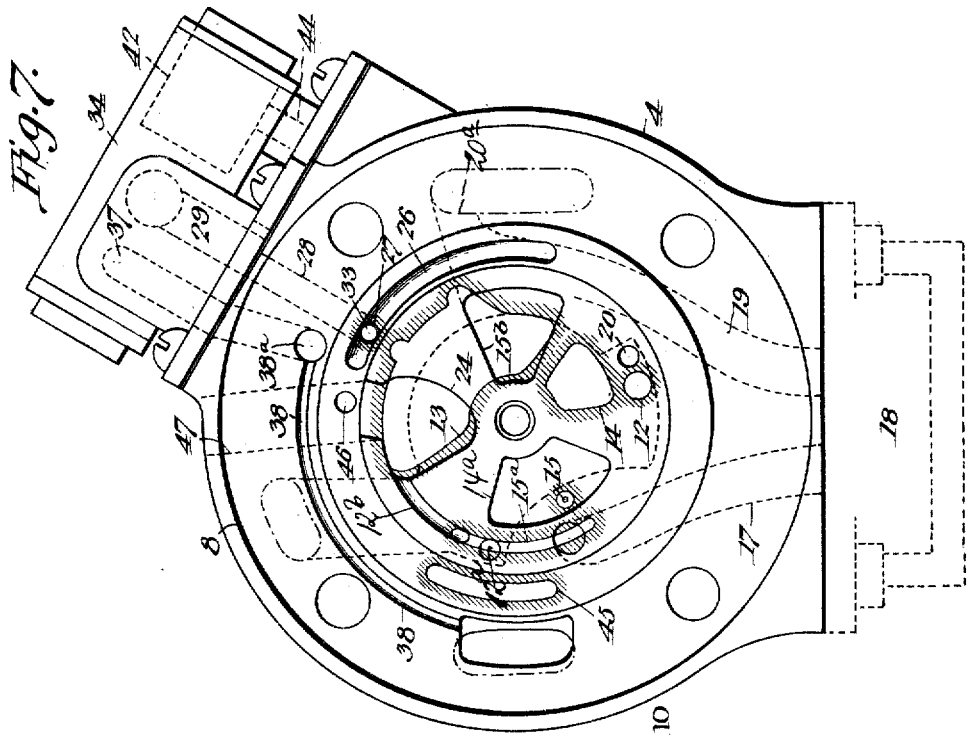
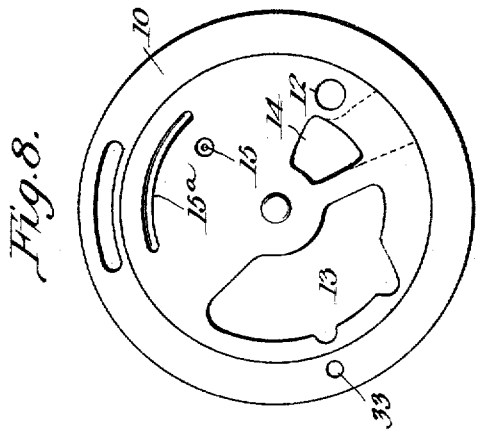
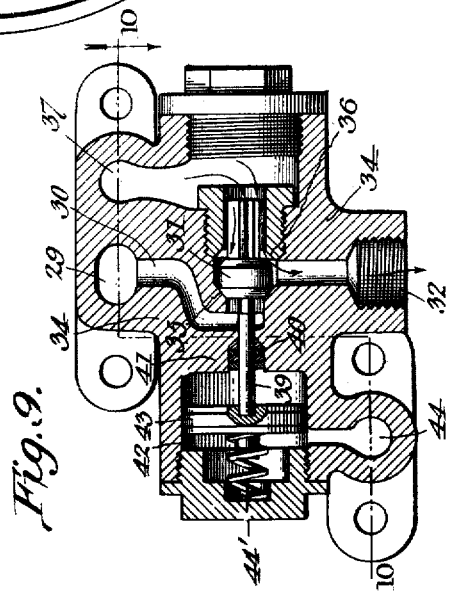
Witnesses:
Inventor,
James A. Hicks
By H. L. Davis
his atty.

UNITED STATES PATENT OFFICE.

JAMES AMERS HICKS, OF ATLANTA, GEORGIA, ASSIGNOR TO HICKS IMPROVED ENGINE BRAKE COMPANY, OF ATLANTA, GEORGIA, A CORPORATION OF GEORGIA.

FLUID-PRESSURE BRAKE SYSTEM.

1,306,665.  Specification of Letters Patent.  Patented June 10, 1919.

Application filed April 6, 1906. Serial No. 310,333.

*To all whom it may concern:*

Be it known that I, JAMES A. HICKS, a citizen of the United States, residing at Atlanta, in the county of Fulton and State of Georgia, have invented new and useful Improvements in Fluid-Pressure Brake Systems, of which the following is a specification.

The present invention relates to fluid pressure brake systems, or, as they are commonly called, "air-brakes," and particularly to that part of such an equipment known as the "engineer's valve," so called for the reason that it is installed in the locomotive cab in convenient position accessible to the engineer, and because it forms the instrumentality by means of which the engineer controls and manipulates the air in applying and releasing the brakes.

In systems of braking of this fluid pressure type, it is highly important that the engineer shall at all times and under all conditions of service have absolute control of his air; and a further important thing is that the equipment shall be such as to guard against abnormal and dangerous conditions arising either because of forgetfulness, carelessness, or disability of the engineer, so that the system will remain always in proper working condition.

The engineer's valve which I have invented and which will be set forth in detail hereinafter is designed with the object of simplifying the structural instrumentalities necessary to manipulate the air; to reduce the sum of the valve operations needed for complete control of brakes under all conditions; to permit great flexibility of brake manipulations to meet the various service demands; to give an efficient control of the engine and train brakes, and in addition, to give independent control of the engine brakes without interfering with the train brakes, this independent manipulation being accomplished through the agency of the same rotary valve (where the rotary type is used) and valve controlling lever now used, and to eliminate or reduce to a negligible quantity the factor of personal inefficiency and disregard of dangerous conditions in the system, in enginemen.

Briefly stated, my invention consists in a valve which embodies all the features of construction necessary and essential to operation of the train brakes automatically as in the usual system; said valve having also provision for straight-air braking of the engine without the necessity of triples or auxiliaries for the engine brakes, the valve being capable of manipulation to effect an independent application or release of the engine brakes without affecting the train brakes, or for a practically simultaneous application or release of both engine and train brakes, such application, however, while it is substantially and for all practical purposes simultaneous, being so timed that the engine brakes in application shall have a slight lead over the train brakes, while in release they shall retard behind the train brakes, or may, if desired, be held set after the train brakes have been thrown off, and until such time as the engineman wishes to release all brakes.

In illustrating and describing my invention I shall show it as applied to that type of engineer's valve known as the Westinghouse, which has long been in use, (this type being well illustrated in Pat. 401,916, dated April 23, 1889, Westinghouse and Moore, now expired), and the construction and operation of which is well-known, and in the detailed description which follows I shall make only such reference to the old and well known valve-structure as will make clear my invention and its applicability.

While my invention is shown as combined with and built up with the engineer's valve proper, it will be understood that those parts capable of coöperation with the usual engineer's valve to effect the new results aimed at by me, need not of necessity be actually secured to and associated with the engineer's valve casing, but may be located at any convenient point so long as they are connected for proper pressure manipulation with the engineer's valve.

In the description hereinafter reference will be had by numerals to the several figures in the drawings accompanying and forming a part of this specification, and which disclose one embodiment of my invention, like numbers indicating like parts in the several views; and in the claims at the end of the specification I shall set forth with particularity those features which I deem novel and of my invention:

In said drawings:

Figure 1 is a view in elevation, partly in section, of an engineer's valve embodying my improvements on line 1, Fig. 2.

Fig. 2 is a plan view of the ported valve seat showing the ports and port connections; the valve proper being delineated diagrammatically in what, for convenience will be called its "1st position"; such position being what is commonly termed "full release."

Fig. 3 is a view similar to Fig. 2, showing the valve in what will be called its "2nd position," such position being what is commonly termed "running position."

Fig. 4 is a similar view with the valve in "3rd position" or "on lap."

Fig. 5 is a similar view showing the valve between "running position" and "on lap" position.

Fig. 6 shows the valve in "4th position" or at "service application."

Fig. 7 shows the valve in "5th position" or at "emergency application."

Fig. 8 is a view of the valve proper which is diagrammatically laid on the ported valve seat in the figures just described.

Fig. 9 is a detail view in section of the automatic safety valve by means of which the control of the straight air for the engine brakes is effected, and by the use of which I am enabled to dispense with auxiliaries and triples on the engines.

Fig. 10 is a detail sectional view on line 10—10, of Fig. 9.

Fig. 11 is a detail sectional view on line 11—11 of Fig. 2.

In the drawing 2 indicates the valve casing, made up, as is customary, of the lower section 3 for the equalizing piston and train line outlet, the middle or valve-seat section 4 bolted or otherwise secured to the lower section 3, with an interposed gasket or packing ring to seal the joints, the ported valve seat 5 on said section 4, the cover or hood section 6 inclosing the valve and valve seat and forming the air chamber above the valve, and the external valve operating spindle and handle 7, all of which elements are, in the main, made up and assembled in the usual manner.

The valve (referring to the general structure) has the usual connections, indicated in the drawings (Fig. 1) as "main reservoir," "train line," "exhaust," "indicator" etc., by appropriate lettering, to effect the feeding of the valve and its associated elements, the direction of the flow of air being indicated by arrows.

The valve seat section 4 has the annular seat 8 surrounding the valve seat 5, to receive a metal gasket 9, (see Fig. 11) to form a properly packed joint between the section 4 and the hood section 6, all of which, generally speaking, is as found in engineer's valves of the type referred to.

The valve 10 is rotatably mounted upon the valve seat 5 and held in place by a central pin or pivot lug 11, said valve 10 having the main reservoir feed port 12 open to main reservoir pressure, the passage or cavity 13, the passage 14, the warning port 15, and the preliminary exhaust passage 15$^a$ all of ordinary design and arrangement.

The valve seat 5 has the supply port 16 which receives air through the main reservoir feed valve port 12 from main reservoir supply, and through passage 17, (see dotted lines) delivers it through any suitable feed or reducing valve 18, to passage 19 (see dotted lines) thence to cavity 13, from which cavity it passes, by port 20$^a$ to train line and by port 20 to chamber 22 above the equalizing piston which controls the automatic exhaust valve 23 (see Fig. 1).

The valve seat 5 has, as well, exhaust or atmospheric port 24, communicating with the usual exhaust passage, which port 24 is caught by valve cavity 13 to reduce train line for "emergency" (see 5th position, Fig. 7). Furthermore, the seat 5 has the preliminary exhaust passage 12$^b$ which leads to port 24 and serves to connect preliminary exhaust port 12$^a$ from the equalizing chamber 22 with the port 24 when the valve passage 15$^b$ bridges port 12$^a$ and passage 12$^b$, as in "service" and "emergency" applications, Figs. 6 and 7, respectively.

The construction thus far set forth is old in the art, is usual in the type of engineer's valve under consideration, and has to do with automatic train braking, which is not interfered with or modified as a distinct operation, but is supplemented and amplified in its general usefulness by being coupled with my improvements. This being the case, it is obvious that it is needless to review specifically the function of the various instrumentalities, and their usual and ordinary coöperation, in the matter of automatic train braking, as this operation, in considering my improvements, may be taken as being effected in the customary manner and by the common expedients.

The valve seat 5 in addition to the customary ports and passages noted, has a passage 26 hereinafter termed the "engine feed passage," this passage 26 in the embodiment of my invention herein shown, being arranged circumferentially just outside of the ordinary automatic control ports, although it should be understood that I do not confine myself to the particular disposition of any of the ports, passages, etc., which are adopted, as this is largely a matter of structural design, changes in which do not alter or depart from the principles involved. The engine feed passage 26 delivers through a port 27 to passage 28 (see dotted lines) the passage 28 leading to the chamber 29 which connects, by passage 30, past automatic double check-valve 31, with the connection 32 to the engine and tender brake cylinders.

The valve 10 is provided with a port 33, which will be referred to as the "engine feed port," which is arranged to catch the engine feed passage 26 as the valve 10 is brought to engine braking positions, that is "on lap" (Fig. 4), "intermediate" position, (Fig. 5), "service application," (Fig. 6); and "emergency" (Fig. 7), and feed air at main reservoir pressure to the said engine feed passage 26, in all of the positions above mentioned, said engine feed port 33 being in communication at all times with the chamber in the upper hood section 6 of the valve, which, as is understood, carries always main reservoir pressure.

The said automatic double check valve 31 is mounted in a valve casing 34, secured to the valve seat section 4, and controls two ports 35, 36, one on either side (see Fig. 9), port 35 being the delivery port for the straight air coming from engine feed port 33, by passage 26, port 27, passage 28, chamber 29, and passage 30; while port 36 on the other side of the check valve 31 forms the delivery port for straight air from a chamber 37 in casing 34, said chamber 37 being fed by a passage 38 formed in the top of the valve seat section 4 beneath the gasket 9 and running from the main reservoir inlet, (see Figs. 2 to 6), to port $38^a$, delivering to chamber 37. By means of the straight air feed just set forth, it will be seen that chamber 37 has a constant straight air supply at main reservoir pressure, tending to force the check valve 31 to the position shown in full lines in Fig. 9, and admit straight air to the engine brake cylinder connection 32, which is common to both ports 35 and 36. In order to keep the check valve 31 normally closed against the constant straight air pressure port 36, the check valve 31 has a stem 39 which slides in a packed stem bearing 40 in a web or wall 41 of the casing 34 and projects into a piston chamber 42 where it engages loosely a piston 43 freely movable in said chamber 42. The piston 43 is subjected to train line pressure on its side opposite the valve stem connection by means of a passage 44, (see Figs. 1 and 10), which enters the train line pressure chamber in the lower section 2 of the valve below the equalizing piston. It will be clear that the area of piston 43 is so much greater than the area of the double check valve 31 which is subjected to constant engine feed pressure from chamber 37, that while the train line is intact the piston 43 will normally keep the check valve 31 in position to close the port 36 against constant engine feed and leave port 35 open for the controlled engine feed from passage 30, chamber 29, passage 28, port 27, and passage 26, which, as hereinbefore set forth, are controlled by the manipulations of the valve 10 to its various positions. The connection between the valve stem 39 and piston 43 is, as stated and shown, preferably a loose one, to the end that certain independence of angular movement or play may be permitted for each element, I having found that more accurate seating of the check valve results with this construction, although as this is a detail of construction, it may be modified or altered as may be found desirable. To prevent jumping and hammering of the check valve 31 and piston 43, during operation, I preferably steady their movements by interposing a spring $44^a$ between the piston and the end wall of the casing 34, as shown in Fig. 9.

The valve 10, in addition to the engine feed ports, passages, and control devices just described, has a passage 45 arranged to catch the port 27 hereinafter termed the " engine exhaust passage " and during certain positions of the valve 10, establish communication between port 27, passage 28, and check-valve chamber 29, with a port 46 leading to the exhaust passage 47, so as to keep the chamber 29 normally at atmospheric pressure, under which conditions it is obvious that the engine brakes are released.

It is deemed expedient at this point to set forth the action of the valve in the several positions shown in Figs. 2 to 7, inclusive, in order that the operation of my improvements may be clear.

Taking the " 1st position," or " full release," shown in Fig. 2, it will be seen that valve main reservoir feed port 12 is in communication with preliminary exhaust $12^a$, in the valve seat section 4, while cavity 13 is bridging seat ports $14^a$ and $15^b$, feeding straight air direct to the train line, the port 16 to the reducing valve 18 being blanked, as will be clear from an inspection of Fig. 2. Under these conditions, of course, the brakes on the train will be at full release, while the engine brakes will remain set, the engine exhaust passage 45 being blanked in " full release " position, as clearly shown in Fig. 2.

In the " 2nd position " shown in Fig. 3, or " running position," the valve main reservoir port 12 is feeding to port 16, through the passages 17 and 19, to reducing valve 18, to train line port $20^a$ in the valve seat 5, and thence to train line, the seat port $14^a$ being blanked in this " running position " (see Fig. 3), so that air passes to the train line only through the reducing valve 18.

It will be seen that in " running position "

of the valve, the engine brakes will be held in release position, for in the position shown in Fig. 3, the engine exhaust passage 45 has caught the port 27 from the chamber 29 and brought it into communication with exhaust port 46 so as to establish atmospheric pressure from engine brake cylinders. This "2nd" or "running position" is, of course, what may be termed normal, and is the condition under which the train is ordinarily held during running, with the brakes released on engine and train, and the main reservoir pressure feeding to the train line through the reducing valve.

Turning now to Fig. 4, showing the "3rd position," or "on lap," it will be seen that equalizing chamber port 20 in the valve seat 5 is blanked, and that valve seat port 16 is also blanked, so that the train line is in condition for action whenever the valve is thrown to "service application," or "emergency" to set the train brakes.

When the valve 10 has been advanced to this "3rd" or "on lap" position, shown in Fig. 4, it will be seen that engine feed port 33 has caught the engine feed passage 26 and is feeding air by passage 26, port 27, passage 28, chamber 29 and passage 30, past the double check valve 31 to the brake cylinders of engine and tender, and the brakes on the engine and tender are applied by straight air pressure. It will be seen that in this "on lap" position the train brakes have not been set for the reason that preliminary exhaust passage 15$^a$ in the valve 10 has not advanced far enough to catch preliminary exhaust port 12$^a$ and bridge said port and the seat passage 12$^b$, which leads to atmospheric or exhaust port 24 in the valve seat, and if desired the valve 10 may be brought back to "running position" after braking the engine in the manner just stated, without touching the train brakes. In other words, absolute independence of engine brakes is secured and they may be applied, held and released without affecting the train brakes. It will be seen that if the valve 10 should be thrown to "on lap" position and left for any appreciable length of time, the engine and tender brakes, which are receiving air at main reservoir pressure, will be set, so that before the train line can leak away and become depleted the engine and tender brakes will be set and the engineer forced to come back to "running position" before the engine brakes can be released.

In addition to this desirable feature of my improvements, attention is directed to the fact that with my invention it is possible, by moving the valve 10 to the position shown in Fig. 5, to get an application of the engine brakes without intermitting or stopping the train line feed. In the position shown in Fig. 5, the valve 10 is placed between "running" and "on or full lap" positions, under which conditions, as will be seen from inspection of Fig. 5, the feed port 16 is caught by the valve main reservoir feed port 12, and the cavity 13 is still in communication with train line feed port 20$^a$ to the train line and the equalizing chamber port 20, so as to keep up the feed to both train line and equalizing chamber. At the same time engine feed port 33 has caught engine feed passage 26, and air is being fed to the engine brake cylinders to pick up and lightly apply the engine and tender brakes; all of this taking place without interrupting train line feed. It will be obvious that if the valve 10 be left in this position for any appreciable period of time, the engine and tender brakes will be fully set, and thus any danger of an "air brake failure" by leaving the valve in this position is avoided.

Referring now to Fig. 6, showing the "4th position" or "service application," it will be seen that passage 15$^a$ has bridged port 12$^a$ and passage 12$^b$ to take the pressure off the equalizing chamber 22, so that the train brakes will make a service application in the usual manner, the engine brakes being steadily applied at the same time, by straight air from the engine supply port 33, engine feed passage 26, port 27, passage 28, chamber 29, port 35, and engine brake cylinder connection 32.

It will be seen that although the engine brakes may be independently applied and released without interfering with train line feed, and without breaking the train line pressure, as described in connection with Fig. 4 (on lap position) and Fig. 5 (between running and lap positions), that when the valve 10 is thrown to "service application" position, Fig. 6, the action of the engine and train brakes is substantially and for all purposes, simultaneous although the engine brake application has always a slight lead over the train brake application, for the angular movement of the valve 10 from engine service application to train service application being so small that the interval of time between engine service application and train service application is negligible, and the applications are, as stated, practically simultaneous; and this simultaneous application is the more surely secured by reason of the fact that in throwing the valve 10 to "service application" (Fig. 5) the braking of the engine will not take place until approximately the instant that the faster acting automatics on the train have picked up and applied the train brakes, this being due to the fact that after the engine supply port 33 has caught the engine feed passage 26 and before the pressure will be fully effective on the brake cylinders of the engine, the preliminary exhaust passage 15ª in the valve 10 will have bridged preliminary exhaust port 12ª and passage 12ᵇ in the valve seat 4, relieving the equalizing piston and breaking the train line in the usual manner for "service application." It should be noted, however, that while this application of engine and train may be, in actual practice, to all intents and purposes, simultaneous, the construction of the valve is such as to insure sending the air to the engine brakes as the first step, and no danger of setting the train brakes without picking up the engine brakes can possibly arise.

It will be seen that when valve 10 reaches "service application" with the preliminary exhaust passage 15ª in the valve 10 bridging the preliminary exhaust port 12ª and exhaust passage 12ᵇ in the valve seat 4, and reduces reservoir pressure, that while the pressure in piston chamber 42 will be reduced through passage 44 running from piston chamber 42, to chamber 22 below the equalizing piston 21, and to the atmosphere past valve 23, as will be clear from Fig. 1, yet under ordinary "service application," such reduction will not be sufficient to release the piston 43, which, as stated, is of large area, and allow the check valve 31, of small area, to be forced over by the main reservoir pressure in chamber 37, so that the check valve 31 will still close the port 36 and keep the engine brake under the controlled engine pressure passing from chamber 29 through port 35.

When the valve 10 is thrown to "5th position" or "emergency," as shown in Fig. 7, the cavity 13 in valve 10 is bridging exhaust port 24, and train line port 15ᵇ, preliminary exhaust port 12ª and passage 12ᵇ are bridged by valve exhaust passage 15ª, exhausting the equalizing chamber 22, with the result that the train line is completely exhausted, the supply port 16 and feed port 20 are blanked, and the train brakes are set. Under this "emergency" condition the engine feed port 33 stands directly over port 27, and while the train line pressure on piston 43 has been destroyed by emergency application, the check valve 31 will still keep port 36 closed, and main reservoir pressure will pass to the engine and tender brake cylinders through port 35, for the reason, that since check valve 31 is subjected to equal pressure on both sides, it will be maintained in its normal position closing main reservoir pressure port 36.

If, however, the train line should be destroyed by reason of some abnormal condition, such as parting of the train and breaking of the train line hose, or by bursting of train line hose, it will be obvious, that train line pressure is at once destroyed in chamber 42, the piston 43 will be relieved, and the constant main reservoir pressure from chamber 37, can then force check valve 31 away from port 36 and allow the reservoir pressure to go to engine and tender brake cylinders.

The train and engine brakes under "emergency" application as above described are set to the limit, and will so remain until valve 10 has been brought back to normal or "running position," and the train line pressure restored. Restoration of train line, of course, brings the safety check valve 31 and piston 43 back to normal position with controlled engine pressure port 35 open for controlled engine pressure from chamber 29. This being the case, it will be observed that the train brakes will be released slightly in advance of the engine brakes, or, if desired, the engine brakes may be retained by throwing back the valve 10 to "full release," which is generally deemed advisable after an emergency stop, for the obvious desirability of feeding up the train line as quickly as possible to release the automatics, for the reason that the engine brakes will not throw off during the time the valve 10 is thrown from "emergency" to "full release," that is, from the "5th position" shown in Fig. 7 to the "1st position" shown in Fig. 2, in which last position the engine exhaust passage 45 is blanked. When train line pressure has been brought up to normal, however, the piston 43 will move the check valve 37 over to close port 36, and cut off main reservoir pressure, and when the valve 10 is brought to "running position," Fig. 3, the exhaust passage 45 will establish communication between ports 27 and 46, and the engine brakes will be released.

Another position and an additional result which may be attained by my improvement, is to so manipulate it as to hold the train brakes and release the engine brakes, which condition, if deemed desirable for any reason, as, for example, to prevent undue heating of the driver tires by continued application of the engine brakes, may be brought about by throwing the valve 10 from either "service" or "emergency" positions, as shown in Figs. 6 and 7, back to a point in its angular movement where the port 12 is blanked between the preliminary exhaust port 12ª and the feed port 16, in which position the train brakes will be held, the rapidity of movement of port 12 past feed port 16 preventing any appreciable feed-up of the train line, while the engine exhaust passage 45 will, in such position of the valve, bridge the passage 26 and port 46 and so exhaust the engine brake cylinders and release the engine brakes.

Obviously from such a position the valve 10 may be brought either to full release and the train line fed up rapidly, or it may be brought to running position and the train line fed up through the feed-valve.

In order that the main reservoir pressure for the engine and tender brakes application may be led from the connection 32 to the brake cylinders and be as readily exhausted therefrom without the necessity of using separate feed and exhaust pipes, I connect the main reservoir engine brake pipe 48 (see Fig. 1) with any suitable feed or reducing valve 49, which will reduce main reservoir pressure, whatever that may be, to engine brake pressure. The pressure pipe 48 and brake cylinder pipe 50 deliver to a chamber 51 formed in a casing, which may be secured, as shown, to the feed valve casing. This chamber has a check valve 52 opening from the brake cylinder side of the valve, so that when the main reservoir pressure goes to the brake cylinders the check valve 52 closes and the pressure passes through the reducing valve 49 to the brakes. When, however, the valve 10, after an application either " engine service ", " train service " or " emergency ", is brought back to " running position ", with the engine exhaust passage 45 bringing the ports 27 and 46, the brake cylinders may exhaust back to the chamber 51, past check valve 52, through pipe 48, passage 32, past double check valve 31, to chamber 29, passage 28, to port 27, engine exhaust passage 45 and port 46, to atmosphere.

In this way it will be seen that I am able to dispense with the usual supply pipe and exhaust pipe used in straight air engine braking, and apply and exhaust through the single brake pipe 48, and this is distinctly an improvement in existing equipments, as it reduces cost of installation and maintenance and simplifies construction.

While I have shown this automatic pressure controlling valve just described as connected directly to and carried by the engineer's valve casing, which construction gives a close assemblage of parts and compact arrangement, it will be understood that such automatic valve will operate with equal efficiency and in the same manner as described in any part of the system so long as the proper pressure connections be preserved.

It is thought not necessary to review the operation of the valve set forth, as the action of the several instrumentalities will, it is believed, be clear from the description of construction and operation set forth in describing them.

It will be seen that the engineer's valve which I have invented is simple and compact in construction; that it is sure in operation; that it gives the same control of train brakes now secured by the standard engineer's valves now in use; and that additionally it makes provision for engine brake control which gives an extremely flexible and efficient system, and one calculated to safeguard against many of the abnormal and dangerous conditions which arise in service.

While I have shown a particular embodiment of my invention, it will be understood that this is merely illustrative and not restrictive of my invention; for, obviously, different mechanical expressions of my invention may be devised without departing from the principles thereof, and as those changes and expedients which are merely mechanical, are clearly within the purview of my invention, I do not limit myself to the details of the illustrative embodiment of my invention shown and described herein, except in so far as I am limited by the prior art to which this invention belongs.

Having described my invention, I claim:

1. Controlling instrumentalities for fluid-pressure brake systems, having ports and passages for the usual automatic train-brake service, and ports and passages for feeding main reservoir pressure to the engine-brakes, comprising a manual valve device through which the air for both services passes and which controls directly the air for both services, said valve device being manipulable to give separate control of both services and effect the usual service application of train brakes, and an automatic valve to control main reservoir feed to the engine brakes.

2. Controlling instrumentalities for fluid-pressure brake systems, having ports and passages for the usual automatic train-brake service, and ports and passages for feeding main reservoir pressure to the engine-brakes, comprising a common manual valve device through which the air for both services passes and which is in direct control of the air for both services and effects the usual service application of train brakes, said manual valve being manipulable to insure engine-brake application in advance of train-brake application, and an automatic valve device to effect application of main reservoir pressure to the engine-brakes.

3. Controlling instrumentalities for fluid-pressure brake systems, having ports and passages for effecting the usual automatic train-brake service, ports and passages for effecting straight-air engine-brake service, a common manually movable valve device through which the air for both services passes and which controls directly the air for both services, said valve device being manipulable to effect the usual service application of train brakes and to secure straight air engine-brake service separately of train-brake service, and means for securing an automatic application of straight-air to the engine brakes upon reduction of pressure in the train pipe of the automatic train-brake service.

4. Controlling instrumentalities for fluid-pressure brake systems, having ports and passages for effecting the usual automatic train-brake service, ports and passages for effecting straight-air engine-brake service, a common manually movable valve device through which the air for both services passes and which controls directly the air for both services and manipulable to effect the usual service application of train-brakes and to secure engine-brake service separately of train-brake service, and means normally held inactive by train-line pressure for securing an automatic application of the straight-air to the engine-brakes upon reduction of pressure in the train pipe of the automatic train brake service.

5. Controlling instrumentalities for fluid-pressure brake systems having ports and passages for effecting the usual automatic train-brake service, ports and passages for effecting straight-air engine-brake service, a common valve device through which the air for both services passes and which gives direct control of pressure for both train and engine brakes and movable to secure the usual service application of train brakes, a single control handle for said valve device by which the engine-brake application may be manually effected in advance and separately of train-brake application, and automatic means for securing application of straight-air to the engine-brakes upon reduction of pressure in the train pipe of the automatic train-brake service.

6. Controlling instrumentalities for fluid-pressure brake systems having ports and passages for effecting the usual automatic train-brake service and ports and passages for effecting straight-air engine-brake service; a singly manually movable element through which the air for both services passes to give direct control application and release of both train and engine brakes, said element being manipulable to secure the usual service application of train-brakes and effect the straight-air engine-brake application in advance and separately of automatic train-brake application; and means normally held inactive by train-line pressure for automatically effecting application of straight-air to the engine brakes upon reduction of pressure in the train-pipe of the automatic train-brake service.

7. Controlling instrumentalities for fluid-pressure brake systems having ports and passages for effecting the usual train-brake service, and ports and passages for feeding main reservoir pressure to the engine brakes, comprising a single manually movable element through which the air for both services passes to give direct and separate control of the train-brake ports and passages and the main reservoir engine brake feed in certain positions, and operable to secure the usual service application of train brakes, and means operable automatically upon reduction of pressure in the train pipe of the train-brake service to effect application of main reservoir pressure to the engine-brakes.

8. Controlling instrumentalities for fluid-pressure brake systems having the usual automatic service for train-brakes and a straight-air service for engine-brakes; comprising, in combination, a common manually operative valve-device to give separate control of both the automatic train-brake service and the straight-air engine-brake service, and a control valve for the straight-air engine-brake service normally under different pressures on opposite sides and operating automatically upon reduction of train-pipe pressure in the automatic service to effect an application of engine brakes.

9. Controlling instrumentalities for fluid-pressure brake systems having the usual automatic service for train-brakes and a straight-air service for engine brakes; comprising, in combination a manually operative value device to give separate control of both the automatic train-brake service and the straight-air engine brake service in certain positions, and a second control device for the straight-air engine-brake service subject normally on opposite sides to differential pressures and operating automatically upon predetermined variation in pressures to effect an application of engine-brakes.

10. Controlling instrumentalities for fluid-pressure brake systems having the usual automatic service for train-brakes and a straight-air service for engine-brakes; comprising, in combination, a manually operative valve device manipulable to give separate control of both services in certain positions, and a control device for the straight-air engine-brake service subject normally on opposite sides of differential pressures and operating automatically to apply straight air to the engine brakes.

11. An engineer's brake valve for fluid-pressure brake systems, comprising, in combination, ports and passages for effecting train-brake service, means for feeding main reservoir pressure to the engine-brakes, a single manually-movable element to control the engine feed and the train brake ports and passages, a second main reservoir feed to the engine brakes, and means normally closing said second main reservoir feed.

12. An engineer's brake valve for fluid-pressure brake systems, comprising, in combination, ports and passages for effecting train brake service, means for feeding main reservoir pressure to the engine brakes, a single manually-movable element to control the engine feed and the train brake ports and passages, a second normally closed main reservoir feed to the engine brakes, and means operable upon reduction of train line pressure to open said second main reservoir feed.

13. An engineer's brake valve for fluid-pressure brake systems, comprising, in combination, ports and passages for effecting train brake service, means for feeding main reservoir pressure to the engine brakes, a single manually-movable element to control the engine feed and the train brake ports and passages, a second normally closed main reservoir feed to the engine brakes, and means normally closed by train line pressure but operable upon reduction of train line pressure controlling said second feed.

14. An engineer's brake valve for fluid-pressure brake systems, comprising, in combination, ports and passages for effecting train brake service, means for feeding main reservoir pressure to the engine brakes, a single manually-movable element to control the engine feed and the train-brake ports and passages, a second main reservoir feed to the engine brakes, and a pressure operated check-valve normally under train line pressure closing said second feed.

15. Controlling instrumentalities for fluid-pressure brake systems having ports and passages for effecting automatic train-brake service, ports and passages for applying main reservoir pressure to the engine-brakes, a manual valve device common to the automatic train service ports and the main reservoir engine service ports and capable of securing the usual service application of train-pressure, a second main reservoir feed to the engine brakes, and a valve device common to both main reservoir feeds which operates automatically on reduction of pressure in the train pipe of the automatic train brake service to open said second main reservoir feed and close said first main reservoir engine feed.

16. In a fluid pressure brake system, instrumentalities, including a manually operative valve, for automatic train-brake service and operable to secure the usual service application of train brakes; an independent main reservoir feed and exhaust passage for the engine brakes controlled by said manual valve; and a second main reservoir feed to the engine-brake normally closed but opening upon reduction of pressure in the train pipe of the automatic train-brake service.

17. In a fluid-pressure brake system, instrumentalities, including a manually operative valve for automatic train-brake service and operable to secure the usual service application of train brakes; an independent main reservoir feed and exhaust passage for the engine brakes controlled by said manual valve; and a second valve responsive to reduction of pressure in the train pipe of the automatic train brake service to open a second main reservoir feed and close said first main reservoir feed and exhaust passage for the engine brakes.

18. An engineer's brake valve for fluid-pressure brake systems, comprising, in combination, ports and passages for effecting train brake service, means for feeding main reservoir pressure to the engine brakes, a single manually-movable element to control the engine feed and the train brake ports and passages, a second main reservoir feed to the engine brakes, and a double check-valve controlling both engine feeds.

19. An engineer's brake valve for fluid-pressure brake systems, comprising in combination, ports and passages for effecting train brake service, means for feeding main reservoir pressure to the engine brakes, a single manually-movable element to control the engine brake feed and the train brake ports and passages, a second main reservoir engine-brake feed, and a double check-valve normally closing said second engine-brake feed, but releasable upon reduction of train line pressure to open said second feed.

20. An engineer's brake valve for fluid-pressure brake systems, comprising, in combination, ports and passages for effecting train-brake service, means for feeding main reservoir pressure to the engine-brakes, a single manually-movable element to control the engine-brake feed and the train-brake ports and passages, a second main reservoir engine-brake feed, and a double check-valve controlling both engine brake feeds and normally closed by train line pressure against said second engine-brake feed, but releasable upon reduction of train-line pressure to open said second feed.

21. An engineer's brake valve for fluid-pressure brake systems, having the usual ports and passages for automatic train-brake service, a rotary valve operable to secure the usual service application of train brakes, a main reservoir feed for the engine brake controlled by said rotary valve, a constant main reservoir supply for the engine brakes independent of said rotary valve, and automatic means normally subject to differential pressures and operable by variations in such pressures for automatically controlling said constant supply.

22. An engineer's brake valve for fluid-pressure brake systems, provided with the usual ports and passages for effecting automatic train-brake service, a rotary valve through which the air for automatic train-brake service and for engine brake service for controlling said ports and passages, two main reservoir supply feeds for engine brake service one of which supplies air to the engine brakes without making application of train brakes and is manually controlled by said rotary valve, and means automatically operable by opposed train-line and main reservoir pressures controlling the other feed.

23. An engineer's brake valve for fluid-pressure brake systems having the usual ports and passages for effecting automatic train-brake service, a rotary valve controlling said train-brake ports and passages and manipulable to secure the usual service application of train-brakes, two main reservoir supply feeds for engine-brake service, one of said feeds being under the control of said rotary valve, and a valve device having train-line pressure on one side and main reservoir pressure on the other side controlling the other of said main reservoir supply feeds for the engine brakes.

24. An engineer's brake valve for fluid-pressure brake systems, comprising, in combination, ports and passages for effecting train-brake service, an engine brake supply port in constant communication with main reservoir pressure, and an engine brake feed passage in the path of said supply port; said engine-brake supply port and feed passage being so disposed relative to the train-brake ports and passages as to insure engine-brake application in advance and independently of train-brake application.

25. An engineer's brake valve for fluid-pressure brake systems through which the air for both train-brake service and engine brake service passes and comprising, in combination, ports and passages for effecting train-brake service, an engine brake supply port in constant communication with main reservoir pressure and an engine-brake feed passage in the path of said supply port, said engine-brake supply port and passage being so disposed relative to said train-brake ports and passages as to permit engine brake application in advance and independently of train-brake application and without interrupting train-line feed.

26. In a fluid-pressure brake system and in combination, an engineer's brake valve having ports and passages for effecting brake application and release, a single connection between said valve and the brake cylinders, a reducing valve in said connection through which the brake cylinders are fed, and a by-pass around said reducing valve through which the brake cylinders are exhausted.

27. In a fluid-pressure brake system and in combination, an engineer's brake valve having ports and passages for effecting brake application and release, a single connection between said valve and the brake cylinders, a reducing valve in said connection through which the brake cylinders are fed, and a by-pass around said reducing valve having a check-valve closed to feed and open to exhaust through which the brake cylinders are exhausted.

28. In a fluid pressure brake system having ports and passages for train brake service and ports and passages for engine brake service, and in combination, a valve device through which air for both services passes having application and exhaust ports and passages giving direct control of both services, said valve device being operable to prevent the engine brake exhaust and retain engine brakes when in full release position for train brakes.

29. In a combined straight air and automatic fluid pressure brake system having ports and passages for automatic train brake service and ports and passages for straight air engine brake service, and in combination, a valve device through which air for both services passes, directly controlling pressure for engine and train brake service and having ports and passages for effecting automatic train brake service and ports and passages for controlling straight air to the engine brakes, said controlling ports for straight air engine brake service being so disposed as to prevent the engine brake exhaust, retain engine brakes, and continue automatic train line feed, when said valve device is between running position and lap position for train brakes.

30. In a fluid pressure brake system having ports and passages for train brake service and ports and passages for engine brake service, and in combination, a valve device having ports and passages for controlling train brake service and ports and passages for controlling engine brake service, said controlling ports and passages for engine brake service being so disposed as to prevent the engine brake exhaust in lap position of the valve device for train brakes and feed engine brakes.

31. In a fluid pressure brake system having ports and passages for train brake service and ports and passages for engine brake service, and in combination, a valve device having ports and passages for controlling train brake service and ports and passages for controlling engine brake service, said ports and passages for engine brake service being so disposed as to insure opening engine brake exhaust in running position of the valve device and permit it to be blanked in the other positions and thereby retain the engine brakes.

32. A valve device for fluid pressure brake systems comprising a valve casing having main reservoir, train-brake service, and engine brake service connections; and means through which air for both services passes for controlling directly the pressure for said train and engine brake service connections operable to secure application of engine brakes in advance of train brakes and to prevent the engine brake exhaust and retain engine brakes when said controlling means is at full release of train brakes.

33. In a fluid-pressure brake system having ports and passages for train brake service and ports and passages for engine brake service, in combination, a valve device having ports and passages for direct control of train brake service, and ports and passages for direct control of engine brake service, said ports and passages for engine brake service being so disposed as to maintain engine brake feed and retain engine brakes in all positions of the valve except running and release positions for train brakes, and to open engine brake exhaust in running position for train brakes.

34. In a fluid pressure brake system, instrumentalities, including a train pipe, equalizing valve, and rotary valve, for effecting automatic application of train brakes upon reduction of train-pipe pressure; a straight-air pressure feed for the engine-brake cylinder under the control of said rotary valve; an independent constant straight-air pressure feed for the engine brakes, and a differential valve device normally closing said constant supply, which differential valve device is released by reduction of pressure in the train pipe of the automatic service.

35. In a fluid pressure brake system and in combination, an engineer's valve, connections under the control of said valve for manually effecting automatic train brake service, a supply of air under pressure, connections under the control of said engineer's valve for manually effecting engine brake application from said supply independently of train brake application and automatic means responsive to train line pressure for effecting engine brake application automatically from said supply independent of the manual control from said engineer's valve.

36. An engineer's brake valve provided with ports communicating with the atmosphere, train pipe, main reservoir, equalizing reservoir and a brake cylinder, and a valve provided with cavities and passages coöperating with said ports and arranged in one position to blank the train pipe, equalizing reservoir and exhaust ports and connect the main reservoir with the brake cylinder port, and in another position to blank the train pipe and equalizing reservoir ports and connect the brake cylinder port to the atmosphere.

In testimony whereof I have hereunto set my hand in presence of two subscribing witnesses.

JAMES AMERS HICKS.

Witnesses:
A. V. CUSHMAN,
GEO. W. REA.

Copies of this patent may be obtained for five cents each, by addressing the "Commissioner of Patents, Washington, D. C."